US011773030B2

United States Patent
Miyamoto et al.

(10) Patent No.: US 11,773,030 B2
(45) Date of Patent: Oct. 3, 2023

(54) CUBIC BORON NITRIDE SINTERED MATERIAL, TOOL COMPRISING CUBIC BORON NITRIDE SINTERED MATERIAL AND METHOD FOR MANUFACTURING CUBIC BORON NITRIDE SINTERED MATERIAL

(71) Applicant: SUMITOMO ELECTRIC HARDMETAL CORP., Hyogo (JP)

(72) Inventors: Keita Miyamoto, Hyogo (JP); Satoru Kukino, Hyogo (JP); Akihiko Ueda, Hyogo (JP); Michiko Matsukawa, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 18/015,298

(22) PCT Filed: Oct. 26, 2021

(86) PCT No.: PCT/JP2021/039446
§ 371 (c)(1),
(2) Date: Jan. 9, 2023

(87) PCT Pub. No.: WO2022/092071
PCT Pub. Date: May 5, 2022

(65) Prior Publication Data
US 2023/0192557 A1    Jun. 22, 2023

(30) Foreign Application Priority Data

Oct. 28, 2020    (WO) .................. PCT/JP2020/040456

(51) Int. Cl.
*C04B 35/5831*    (2006.01)
*C04B 35/628*    (2006.01)
*C04B 41/00*    (2006.01)

(52) U.S. Cl.
CPC .... *C04B 35/5831* (2013.01); *C04B 35/62836* (2013.01); *C04B 35/62892* (2013.01);
(Continued)

(58) Field of Classification Search
CPC .................................................. C04B 35/5831
See application file for complete search history.

(56) References Cited

U.S. PATENT DOCUMENTS

| | | |
|---|---|---|
| 4,666,466 A | 5/1987 | Wilson |
| 4,911,756 A | 3/1990 | Nakai et al. |

(Continued)

FOREIGN PATENT DOCUMENTS

| | | |
|---|---|---|
| JP | S55-126581 A | 9/1980 |
| JP | 62-228449 A | 10/1987 |
| JP | 2012-157939 A | 8/2012 |

*Primary Examiner* — Karl E Group
(74) *Attorney, Agent, or Firm* — Renner, Otto, Boisselle & Sklar, LLP

(57) ABSTRACT

A cBN sintered material comprising cBN particles and a binder phase, in which the binder phase contains AlN and $AlB_2$, a content proportion of cBN particles is 70 to 97 vol %, cBN sintered material has a volume resistivity up to $5 \times 10^{-3}$ Ωcm, a rate of a peak intensity derived from Al with respect to a peak intensity derived from cBN particles is less than 1.0%, cBN particles include fine particles and coarse particles, coarse particles optionally include ultra-coarse particles, with respect to the entire cBN particles, a content proportion α of fine particles is from 10 vol %, a content proportion β of coarse particles is from 30 vol %, a content proportion γ of ultra-coarse particles is 25 vol % or less, and a total of the content proportion α of fine particles and the content proportion β of coarse particles is 50 to 100 vol %.

8 Claims, 8 Drawing Sheets

(52) U.S. Cl.
CPC .. *C04B 41/0072* (2013.01); *C04B 2235/3804* (2013.01); *C04B 2235/3865* (2013.01); *C04B 2235/5436* (2013.01); *C04B 2235/762* (2013.01)

(56) References Cited

U.S. PATENT DOCUMENTS

| | | | |
|---|---|---|---|
| 8,999,531 B2 * | 4/2015 | Kudoh | C04B 35/62685 51/307 |
| 2010/0069225 A1 | 3/2010 | Kountanya et al. | |
| 2013/0034712 A1 * | 2/2013 | Kudoh | C04B 35/62675 428/323 |

\* cited by examiner

CUBIC BORON NITRIDE SINTERED MATERIAL, TOOL COMPRISING CUBIC BORON NITRIDE SINTERED MATERIAL AND METHOD FOR MANUFACTURING CUBIC BORON NITRIDE SINTERED MATERIAL

TECHNICAL FIELD

The present disclosure relates to a cubic boron nitride sintered material, a tool comprising the cubic boron nitride sintered material and a method for manufacturing the cubic boron nitride sintered material. The present application claims priority based on PCT/JP2020/040456, which is an international application under the Patent Cooperation Treaty (PCT), filed on Oct. 28, 2020. The entire content disclosed in the international application is incorporated into the present description by reference.

BACKGROUND ART

Cubic boron nitride (hereinafter, referred to as "cBN" in some cases) is known to have high hardness second to diamond and to have characteristics such as a high thermal conductivity and a low affinity to iron-based materials. Sintered materials of cubic boron nitride (hereinafter, referred to as "cubic boron nitride sintered material" or "cBN sintered material" in some cases) are in use for tools such as cutting tools.

cBN sintered materials that are in use for tools are roughly classified into two types of compositions, that is, sintered materials with a high cBN content rate and sintered materials with a low cBN content rate. Sintered materials with a high cBN content rate have a sintered material structure in which the content rate of cBN particles is high and the cBN particles are bound to one another with a binder phase containing Co or Al as a main component. In contrast, sintered materials with a low cBN content rate have a sintered material structure in which the content rate of cBN particles is low and the cBN particles are bound to one another through ceramic materials such as TiN and TiC.

CITATION LIST

Patent Literature

PTL 1: Japanese Patent Laying-Open No. S55-126581

SUMMARY OF INVENTION

A cubic boron nitride sintered material according to the present disclosure is a cubic boron nitride sintered material comprising cubic boron nitride particles and a binder phase, wherein the binder phase contains aluminum nitride and aluminum diboride, a content proportion of the cubic boron nitride particles is 70 vol % or more and 97 vol % or less with respect to the entire cubic boron nitride sintered material, the cubic boron nitride sintered material has a volume resistivity of $5 \times 10^{-3}$ Ωcm or less, in a case where X-ray diffraction measurement is performed on an arbitrary surface or arbitrary cross section of the cubic boron nitride sintered material, a rate of a peak intensity derived from metallic aluminum with respect to a peak intensity derived from the cubic boron nitride particles is less than 1.0%, the cubic boron nitride particles include fine particles having a particle diameter of 2 μm or less and coarse particles having a particle diameter of 5 μm or more, the coarse particles optionally include ultra-coarse particles having a particle diameter of more than 12 μm, with respect to the entire cubic boron nitride particles, a content proportion α of the fine particles is 10 vol % or more, a content proportion β of the coarse particles is 30 vol % or more, a content proportion γ of the ultra-coarse particles is 25 vol % or less, and a total of the content proportion α of the fine particles and the content proportion β of the coarse particles is 50 vol % or more and 100 vol % or less.

A tool according to the present disclosure comprises the cubic boron nitride sintered material.

A method for manufacturing a cubic boron nitride sintered material according to the present disclosure, the method comprising:

preparing a cubic boron nitride powder and an aluminum material;

obtaining a precursor by bringing the cubic boron nitride powder into contact with the aluminum material; and sintering the precursor at a sintering pressure of 4 GPa or higher and 7 GPa or lower and a sintering temperature of 1000° C. or higher and 1500° C. or lower.

DETAILED DESCRIPTION

Figure 1:
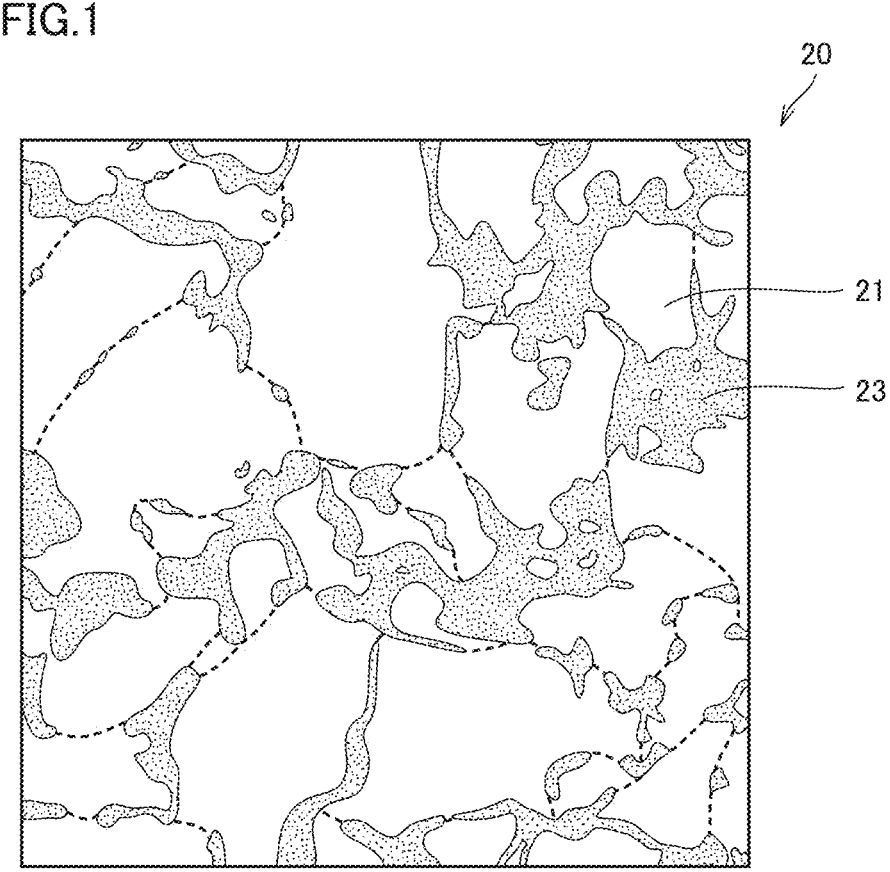
FIG. 1 is a schematic view showing an example of a sintered material structure of a cubic boron nitride sintered material according to the present embodiment.

Problem to be Solved by the Present Disclosure

As a sintered material with a high cBN content rate, for example, Japanese Patent Laying-Open No. S55-126581 (PTL 1) discloses a polished compact having a hard aggregate to which cubic boron nitride particles and lumps of a second phase are bound, in which the content rate of cubic boron nitride in the compact is at least 80 wt. %, adjacent cubic boron nitride particles are bound to each other to form an alternate substance, and the second phase is basically composed of aluminum nitride and/or aluminum diboride.

However, the volume resistivity of the polished compact of PTL 1 is high, and there is room for improvement in a conductive property.

The present disclosure has been made in consideration of the above-described circumstances, and an objective of the present disclosure is to provide a cubic boron nitride sintered material having excellent toughness and an excellent conductive property, a tool comprising the cubic boron nitride sintered material and a method for manufacturing the cubic boron nitride sintered material.

Advantageous Effect of the Present Disclosure

According to the present disclosure, it becomes possible to provide a cubic boron nitride sintered material having excellent toughness and an excellent conductive property, a tool comprising the cubic boron nitride sintered material and a method for manufacturing the cubic boron nitride sintered material.

DESCRIPTION OF EMBODIMENTS

First, embodiments of the present disclosure will be listed and described.

[1] A cubic boron nitride sintered material according to the present disclosure is a cubic boron nitride sintered material comprising cubic boron nitride particles and a binder phase, wherein the binder phase contains aluminum nitride and aluminum diboride, a content proportion of the cubic boron nitride particles is 70 vol % or more and 97 vol % or less with respect to the entire cubic boron nitride sintered material, wherein the cubic boron nitride sintered material has a volume resistivity of $5\times10^{-3}$ Ωcm or less, in a case where X-ray diffraction measurement is performed on an arbitrary surface or arbitrary cross section of the cubic boron nitride sintered material, a rate of a peak intensity derived from metallic aluminum with respect to a peak intensity derived from the cubic boron nitride particles is less than 1.0%, wherein the cubic boron nitride particles include fine particles having a particle diameter of 2 μm or less and coarse particles having a particle diameter of 5 μm or more, wherein the coarse particles optionally include ultra-coarse particles having a particle diameter of more than 12 μm, and wherein with respect to the entire cubic boron nitride particles, a content proportion α of the fine particles is 10 vol % or more, a content proportion β of the coarse particles is 30 vol % or more, a content proportion γ of the ultra-coarse particles is 25 vol % or less, and a total of the content proportion α of the fine particles and the content proportion β of the coarse particles is 50 vol % or more and 100 vol % or less.

The binder phase in the cubic boron nitride sintered material contains conductive aluminum diboride and has a conductive property as the entire binder phase. Therefore, the cubic boron nitride sintered material having such a binder phase is enabled to conduct electricity through the binder phase. In addition, when the content proportions α, β and γ are set to be within the above-described ranges, the cubic boron nitride sintered material is enabled to suppress the generation of voids, which improves the toughness. Therefore, the cubic boron nitride sintered material does not only have an excellent conductive property but is also enabled to exhibit excellent cutting performance (breakage resistance in particular) in the case of being used as a base material for cutting tools. That is, the cubic boron nitride sintered material comprises the above-described configuration and is thereby enabled to have excellent toughness and an excellent conductive property.

[2] In the cubic boron nitride sintered material, it is preferable that, with respect to the entire cubic boron nitride particles, the content proportion α of the fine particles is 10 vol % or more and 20 vol % or less, the content proportion β of the coarse particles is 30 vol % or more and 90 vol % or less, and the content proportion γ of the ultra-coarse particles is more than 0 vol % and 25 vol % or less. When regulated as described above, the cubic boron nitride sintered material does not only have an excellent conductive property but is also enabled to exhibit superior cutting performance in the case of being used as a base material for cutting tools.

[3] In a case where X-ray diffraction measurement is performed on the arbitrary surface or arbitrary cross section of the cubic boron nitride sintered material, the rate of the peak intensity derived from aluminum diboride with respect to the peak intensity derived from the cubic boron nitride particles is preferably 3.9% or more. When regulated as described above, the cubic boron nitride sintered material is enabled to have a superior conductive property.

[4] An area rate of voids that are observed in the arbitrary surface or arbitrary cross section of the cubic boron nitride sintered material is preferably 0.05% or less. When regulated as described above, the cubic boron nitride sintered material is enabled to have not only an excellent conductive property but also an excellent strength.

[5] A tool according to the present disclosure comprises the cubic boron nitride sintered material of any one of [1] to [4]. When regulated as described above, the tool is enabled to have an excellent conductive property.

[6] The tool further comprises a coating that is provided on the cubic boron nitride sintered material, wherein a peeling load is preferably 20 N or more, in a case where a scratch test is performed on the coating with a diamond indenter having R of 200 μm and a cone angle of 120°. When regulated as described above, the tool is enabled to have not only an excellent conductive property but also predetermined characteristics such as wear resistance and breakage resistance.

[7] It is preferable that the coating includes a coated layer composed of a compound represented by $Ti_xM_{1-x}C_yN_{1-y}$, wherein M represents one or more elements selected from the group consisting of Group IV elements except titanium, Group V elements and Group VI elements in the periodic table, aluminum, silicon and boron, x is 0.2 or more and 1 or less, and y is 0 or more and 0.6 or less, in $Ti_xM_{1-x}C_yN_{1-y}$. When regulated as described above, the tool is enabled to have not only an excellent conductive property but also predetermined characteristics such as wear resistance and breakage resistance.

[8] The coating preferably has a thickness of 0.5 μm or more and less than 6.0 μm. When regulated as described above, the tool is enabled to have not only an excellent conductive property but also predetermined characteristics such as wear resistance and breakage resistance.

[9] A method for manufacturing a cubic boron nitride sintered material according to the present disclosure, the method comprising:

preparing a cubic boron nitride powder and an aluminum material;

obtaining a precursor by bringing the cubic boron nitride powder into contact with the aluminum material; and sintering the precursor at a sintering pressure of 4 GPa or higher and 7 GPa or lower and a sintering temperature of 1000° C. or higher and 1500° C. or lower. When regulated as described above, it becomes possible to manufacture a cubic boron nitride sintered material having an excellent conductive property.

[10] The aluminum material is preferably an aluminum plate. When regulated as described above, it becomes possible to manufacture a cubic boron nitride sintered material having a superior conductive property.

DETAILS OF EMBODIMENTS OF THE PRESENT DISCLOSURE

Hereinafter, an embodiment of the present disclosure (hereinafter, referred to as "present embodiment") will be described. However, the present embodiment is not limited thereto. In the present specification, an expression in the form of "A to Z" means the upper limit and lower limit of a range (that is, A or more and Z or less), and, in a case where a unit is not put after A but put after Z only, the unit of A and the unit of Z are the same. Furthermore, in the present specification, in a case where a compound is represented by a chemical formula where the composition proportions of configuration elements are not particularly limited as in, for example, "AlN" and the like, the chemical formula is assumed to include all conventionally-known composition proportions (element proportions). At this time, the chemical formula includes not only stoichiometric compositions but also non-stoichiometric compositions. For example, the chemical formula "AlN" includes not only a stoichiometric composition "$Al_1N_1$" but also a non-stoichiometric composition, for example, "$Al_1N_{0.8}$". This is also true for the expression of compounds other than "AlN".

<<Cubic Boron Nitride Sintered Material>>

A cubic boron nitride sintered material according to the present disclosure is a cubic boron nitride sintered material comprising cubic boron nitride particles and a binder phase, wherein the binder phase contains aluminum nitride and aluminum diboride, a content proportion of the cubic boron nitride particles is 70 vol % or more and 97 vol % or less with respect to the entire cubic boron nitride sintered material, the cubic boron nitride sintered material has a volume resistivity of $5\times10^{-3}$ Ωcm or less, in a case where X-ray diffraction measurement is performed on an arbitrary surface or arbitrary cross section of the cubic boron nitride sintered material, a rate of a peak intensity derived from metallic aluminum with respect to a peak intensity derived from the cubic boron nitride particles is less than 1.0%, the cubic boron nitride particles include fine particles having a particle diameter of 2 μm or less and coarse particles having a particle diameter of 5 μm or more, the coarse particles optionally include ultra-coarse particles having a particle diameter of more than 12 μm, with respect to the entire cubic boron nitride particles,
a content proportion α of the fine particles is 10 vol % or more,
a content proportion β of the coarse particles is 30 vol % or more,
a content proportion γ of the ultra-coarse particles is 25 vol % or less, and
a total of the content proportion α of the fine particles and the content proportion β of the coarse particles is 50 vol % or more and 100 vol % or less.

<Cubic Boron Nitride Particles>

"Cubic boron nitride particles" in the present embodiment mean crystal grains of cubic boron nitride.

(Content Proportion of Cubic Boron Nitride Particles)

The content proportion of the cubic boron nitride particles is 70 vol % or more and 97 vol % or less, preferably 82 vol % or more and 94 vol % or less and more preferably 82 vol % or more and 90 vol % or less with respect to the entire cubic boron nitride sintered material. The content proportion of the cubic boron nitride particles is obtained by capturing a cross-sectional sample of the cubic boron nitride sintered material with a scanning electron microscope (SEM) and analyzing the captured image. Specifically, first, an arbitrary surface or cross section of the cubic boron nitride sintered material is mirror-finished. Next, the processed surface of the cubic boron nitride sintered material is observed with the SEM at a magnification of 3000 to 10000 times to obtain a SEM image. The crystal grains of cubic boron nitride in a predetermined visual field in the obtained SEM image are specified. The sum of the areas of the crystal grains specified by image processing is calculated, and the sum is divided by the area of the visual field, thereby calculating the content proportion of the cubic boron nitride particles. In addition, it is preferable that, in the same cubic boron nitride sintered material, the same image analysis is performed on a plurality of visual fields (for example, five or more visual fields) and the average value thereof is regarded as the content proportion of the cubic boron nitride particles. In the image processing, it is possible to preferably use image processing-type particle size distribution software ("WinROOF ver. 7.4.1" manufactured by Mitani Corporation).

The rate that is obtained by the above-described method is the area rate of the cubic boron nitride particles in the visual field; however, in the present embodiment, the rate is regarded and handled as the volume rate. That is, in a case where the area rate of the cubic boron nitride particles obtained by the above-described method is 80%, the content proportion of the cubic boron nitride particles is regarded as 80 vol % with respect to the cubic boron nitride sintered material. In the entire cubic boron nitride particles to be described below, the content proportion α (vol %) of fine particles, the content proportion β (vol %) of coarse particles and the content proportion (vol %) of the binder phase to be described below are also obtained by the same method.

(Particle Size Distribution of Cubic Boron Nitride Particles)

In one aspect of the present embodiment, the cubic boron nitride particles include fine particles having a particle diameter of 2 μm or less (more preferably 0.5 μm or more and 2 μm or less) and coarse particles having a particle diameter of 5 μm or more (more preferably 5 μm or more and 12 μm or less), the coarse particles may include ultra-coarse particles having a particle diameter of more than 12 μm (more preferably more than 12 μm and 20 μm or less), with respect to the entire cubic boron nitride particles,
the content proportion α of the fine particles is 10 vol % or more,
the content proportion β of the coarse particles is 30 vol % or more,
the content proportion γ of the ultra-coarse particles is 25 vol % or less, and
the total of the content proportion α of the fine particles and the content proportion β of the coarse particles is 50 vol % or more and 100 vol % or less.

The particle diameters of the cubic boron nitride particles can be measured by observing the above-described cross section of the cubic boron nitride sintered material using a SEM. Specifically, the particle diameter (Heywood diameter: equal-area equivalent circle diameter) of each crystal grain is calculated from a captured image of the cross section. The number of crystal grains to be measured is set to at least 200 or more and, furthermore, preferably set to 400 or more. At the time of observing the cross section, the magnification of the SEM needs to be appropriately adjusted such that the above-described number of crystal grains can be observed (for example, 3000 times or the like). The number of visual fields on which image analysis is to be performed is preferably two visual fields or more, more preferably four visual fields or more and still more preferably six visual fields or more. One visual field may be, for example, 26 μm in length and 34 μm in width. The above-described series of operations for calculating the particle diameters of the crystal grains may be performed using image analysis software. As the image analysis software, it is possible to preferably use image processing-type particle size distribution software ("WinROOF ver. 7.4.1" manufactured by Mitani Corporation). For the image analysis software, an appropriate binarization threshold is automatically set based on the image information (the threshold is not arbitrarily set by a measurer). In addition, the inventors have confirmed that measurement results do not significantly fluctuate even in a case where the brightness or the like of the image is fluctuated.

The content proportion α of the fine particles is preferably 10 vol % or more and 20 vol % or less and more preferably 10 vol % or more and 15 vol % or less. The content proportion α of the fine particles can be obtained by the same method as the above-described method for obtaining the content proportion of the cubic boron nitride particles with respect to the entire cubic boron nitride sintered material. That is, the content proportion α (vol %) can be obtained by multiplying a value obtained by dividing the area of the fine particles, which is obtained in the SEM image of the cross-sectional sample, by the area of the cubic boron nitride particles by 100.

The content proportion β of the coarse particles is preferably 30 vol % or more and 95 vol % or less, more preferably 30 vol % or more and 90 vol % or less, still more preferably 35 vol % or more and 77 vol % or less and far still more preferably 40 vol % or more and 65 vol % or less. The content proportion β of the coarse particles can be obtained by the same method as the above-described method for obtaining the content proportion of the cubic boron nitride particles with respect to the entire cubic boron nitride sintered material. That is, the content proportion β (vol %) can be obtained by multiplying a value obtained by dividing the area of the coarse particles, which is obtained in the SEM image of the cross-sectional sample, by the area of the cubic boron nitride particles by 100.

The total of the content proportion α of the fine particles and the content proportion β of the coarse particles is preferably 50 vol % or more and 100 vol % or less, preferably 61 vol % or more and 95 vol % or less and more preferably 70 vol % or more and 90 vol % or less with respect to the entire cubic boron nitride particles.

In one aspect of the present embodiment, with respect to the entire cubic boron nitride particles, the content proportion γ of the ultra-coarse particles having a particle diameter of more than 12 μm is preferably 0 vol % or more and 25 vol % or less and more preferably 0 vol % or more and 15 vol % or less. In the present embodiment, among the coarse particles, coarse particles having a particle diameter of more than 12 μm will be particularly referred to as "ultra-coarse particles". The content proportion γ of the ultra-coarse particles can be obtained by the same method as the above-described method for obtaining the content proportion of the cubic boron nitride particles with respect to the entire cubic boron nitride sintered material. That is, the content proportion γ (vol %) can be obtained by multiplying a value obtained by dividing the area of the ultra-coarse particles, which is obtained in the SEM image of the cross-sectional sample, by the area of the cubic boron nitride particles by 100. When the content proportion γ of the ultra-coarse particles is suppressed within the above-described range, it becomes possible to suppress voids that are generated in the cubic boron nitride sintered material, and furthermore, it becomes possible to provide an excellent conductive property. In addition, when the content proportion γ of the ultra-coarse particles is suppressed within the above-described range, it becomes possible to suppress a decrease in flexural strength, and furthermore, it becomes possible to suppress degradation of the cutting performance in the case of using the cubic boron nitride sintered material as a base material for cutting tools.

In one aspect of the present embodiment, the ratio γ/β of the content proportion γ of the ultra-coarse particles with respect to the content proportion β of the coarse particles is preferably 0 or more and 5/6 or less and more preferably 0 or more and 1/3 or less.

In one aspect of the present embodiment, the cubic boron nitride particles may further include medium particles having a particle diameter of more than 2 μm and less than 5 μm. The content proportion δ of the medium particles is not particularly limited as long as the effect of the present disclosure is exhibited and may be, for example, 0 vol % or more and 60 vol % or less. The content proportion δ of the medium particles can be obtained by the same method as the above-described method for obtaining the content proportion of the cubic boron nitride particles with respect to the entire cubic boron nitride sintered material. That is, the content proportion δ (vol %) can be obtained by multiplying a value obtained by dividing the area of the medium particles, which is obtained in the SEM image of the cross-sectional sample, by the area of the cubic boron nitride particles by 100. In another aspect of the present embodiment, the total of the content proportion α of the fine particles, the content proportion β of the coarse particles and the content proportion δ of the medium particles may be 100 vol %. As described above, since the ultra-coarse particles are a subordinate concept of the coarse particles, it is needless to say that the content proportion γ of the ultra-coarse particles is included in the content proportion β of the coarse particles.

In one aspect of the present embodiment, the area rate of voids that are observed in an arbitrary surface or arbitrary cross section of the cubic boron nitride sintered material is preferably 0.05% or less. The lower limit of the area rate of the voids is not particularly limited and may be, for example, 0% or more. The area rate of the voids can be obtained as described below. First, the cubic boron nitride sintered material is cut at an arbitrary position to produce a cross-sectional sample of the cubic boron nitride sintered material. For the production of the cross-sectional sample, a focused ion beam device, a cross section polisher device and the like can be used. Next, a cross section of the cross-sectional sample is observed with a SEM at 3000 times to obtain a secondary electron image and a backscattered electron image. A region where voids (air gaps) are present becomes a black region in the backscattered electron image and appears as a hollow region in the secondary electron image. Therefore, it is possible to discriminate void portions from both images. Next, a binarization treatment is performed on the backscattered electron image using image analysis software (for example, "WinROOF" manufactured by Mitani Corporation or the like), and the area rate of the voids is calculated from the image after the binarization treatment. That is, the area rate can be obtained by dividing the area of the voids that is obtained in the SEM image of the cross-sectional sample by the area of the measurement visual field. At this time, for the image analysis software, an appropriate binarization threshold is automatically set based on the image information (the threshold is not arbitrarily set by a measurer). In addition, the inventors have confirmed that measurement results do not significantly fluctuate even in a case where the brightness or the like of the image is fluctuated.

<Binder Phase>

"Binder phase" in the present embodiment means a phase that binds the crystal grains of the cubic boron nitride to one another (refer to FIG. 1). The binder phase contains aluminum nitride (AlN) and aluminum diboride ($AlB_2$). The content proportion of the binder phase is preferably 3 vol % or more and 30 vol % or less, more preferably 3 vol % or more and 20 vol % or less, still more preferably 6 vol % or more and 18 vol % or less and far still more preferably 8 vol % or more and 10 vol % or less with respect to the entire cubic boron nitride sintered material.

The content proportion of the binder phase can be obtained by the same method as the above-described method for obtaining the content proportion of the cubic boron nitride particles with respect to the entire cubic boron nitride sintered material. That is, the content proportion can be obtained by dividing the area of the binder phase that is obtained in the SEM image of the cross-sectional sample by the area of the measurement visual field.

In a case where X-ray diffraction measurement (XRD measurement) is performed on an arbitrary surface or arbitrary cross section of the cubic boron nitride sintered material, the rate of a peak intensity derived from aluminum diboride with respect to a peak intensity derived from the cubic boron nitride particles is preferably 3.9% or more, more preferably 5.3% or more and still more preferably 6.0% or more and 8.0% or less.

The peak intensity derived from each component described above can be obtained as described below. First, the composition of each of the cubic boron nitride particles and the binder phases is obtained. At this time, the composition may be obtained by the X-ray diffraction method. Next, a specimen including a cut surface of the above-described cubic boron nitride sintered material is analyzed by the X-ray diffraction method, and the data of an X-ray diffraction pattern is acquired. After that, the peak intensity (the height of the peak; cps) derived from each component is obtained based on the obtained composition of each of the cubic boron nitride particles and the binder phases and the data of the X-ray diffraction pattern. Here, as the conditions for the analysis by the X-ray diffraction method, the following conditions are used.

Conditions for the analysis by the X-ray diffraction method

Characteristic X-ray: Cu-Kα (wavelength of 1.54 Å)
Tube voltage: 40 kV
Tube current: 15 mA
Filter: Multilayer mirror
Optical system: Concentration method
X-ray diffraction method: θ-2θ method In a case where X-ray diffraction measurement (XRD measurement) is performed on an arbitrary surface or arbitrary cross section of the cubic boron nitride sintered material, the rate of the peak intensity derived from the aluminum nitride with respect to the peak intensity derived from the cubic boron nitride particles is preferably 6.0% or more and 12.0% or less and more preferably 7.0% or more and 10.5% or less.

In the present embodiment, in a case where X-ray diffraction measurement is performed on an arbitrary surface or arbitrary cross section of the cubic boron nitride sintered material, the rate of the peak intensity derived from metallic aluminum with respect to the peak intensity derived from the cubic boron nitride particles is less than 1.0%. In such a case, the cubic boron nitride sintered material becomes excellent in terms of strength. The lower limit value of the rate may be, for example, 0% or more.

The binder phase may contain other compounds as long as the effect exhibited by the present disclosure is not impaired. That is, the binder phase may further contain a compound composed of at least one first element selected from the group consisting of Group IV elements, Group V elements and Group VI elements in the periodic table of the elements and silicon (Si) and at least one second element selected from the group consisting of carbon (C), nitrogen (N), boron (B) and oxygen (O).

Examples of the Group IV elements include titanium (Ti), zirconium (Zr) and hafnium (Hf). Examples of the Group V elements include vanadium (V), niobium (Nb) and tantalum (Ta). Examples of the Group VI elements include chromium (Cr), molybdenum (Mo) and tungsten (W). Each component that is contained in the binder phase can be obtained by analyzing a region corresponding to the binder phase in the specimen including the cut surface of the above-described cubic boron nitride sintered material by the SEM-EDX method.

Examples of the compound composed of at least one first element selected from the group consisting of Group IV elements, Group V elements and Group VI elements in the periodic table of the elements and Si and at least one second element selected from the group consisting of C, N, B and O include nitrides such as TiN, carbides such as TiC and WC, borides such as $TiB_2$, oxides such as $TiO_2$ or TiCN.

<Inevitable Impurities>

The cubic boron nitride sintered material may contain inevitable impurities as long as the effect exhibited by the present disclosure is not impaired. The inevitable impurities refer to the collective term of elements and compounds that are possibly contained in small quantities in the raw materials of the cubic boron nitride sintered material or during the manufacturing of the cubic boron nitride sintered material. The content (vol %) of each of the elements and compounds that are contained as the inevitable impurities is 0 vol % or more and 5 vol % or less respectively, and the sum thereof (that is, the total content of a small amount of the impurities) is 0 vol % or more and 5 vol % or less. Therefore, the inevitable impurities may or may not be contained in the cubic boron nitride sintered material. Examples of the inevitable impurities include Li, Mg, Ca, Sr, Ba, Be, Si, Ga, La, Fe, Cu.

<Volume Resistivity of Cubic Boron Nitride Sintered Material>

The cubic boron nitride sintered material according to the present embodiment has the above-described configuration and is thereby enabled to have an excellent conductive property. That is, the volume resistivity of the cubic boron nitride sintered material is $5\times10^{-3}$ Ωcm or less, preferably less than $5\times10^{-3}$ Ωcm, more preferably less than $4\times10^{-3}$ Ωcm and still more preferably less than $3.5\times10^{-3}$ Ωcm. The lower limit of the volume resistivity of the cubic boron nitride sintered material is not particularly limited and is, for example, 0 Ωcm or more.

The volume resistivity is a value obtained by a measurement method by a four-terminal method. Measurement conditions will be described below. Examples of a measuring instrument that is used at this time include MILLIOHM-METER 4328A manufactured by Agilent Technologies Japan, Ltd. Examples of a four-terminal type probe include a pin type probe 16006A manufactured by Agilent Technologies Japan, Ltd.

Measurement Conditions
Dimensions of test piece: 3 mm×1 mm×12 mm
Pretreatment: None
Measurement temperature: 22° C.
Measurement humidity: 60%
Electrode interval: 10 mm <<Tool>>

The cubic boron nitride sintered material of the present embodiment has an excellent conductive property, excellent toughness and high hardness and thus can be suitably used for cutting tools, wear-resistant tools, grinding tools, tools for friction stir welding and the like. That is, the tool according to the present embodiment includes the cubic boron nitride sintered material. The tool may be wholly composed of the cubic boron nitride sintered material or may be only partially composed of the cubic boron nitride sintered material (for example, a cutting edge portion in the case of a cutting tool).

Figure 2:
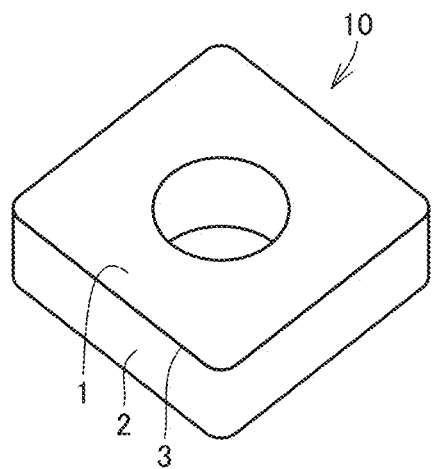
FIG. 2 is a perspective view exemplifying an aspect of a cutting tool in the present embodiment.

Examples of the cutting tool include a drill, an end mill, a cutting edge-replaceable cutting insert for a drill, a cutting edge-replaceable cutting insert for an end mill, a cutting edge-replaceable cutting insert for milling, a cutting edge-replaceable cutting insert for turning, a metal saw, a gear cutting tool, a reamer, a tap, a cutting bite. FIG. 2 is a perspective view exemplifying an aspect of the cutting tool. A cutting tool having such a shape is used as, for example, a cutting edge-replaceable cutting insert. The cutting tool 10 has a rake face 1, a flank face 2 and a cutting edge ridgeline portion 3 where rake face 1 and flank face 2 intersect with each other.

Examples of the wear-resistant tools include a dice, a scriber, a scribing wheel, a dresser. Examples of the grinding tools include an abrasive wheel.

Figure 3:
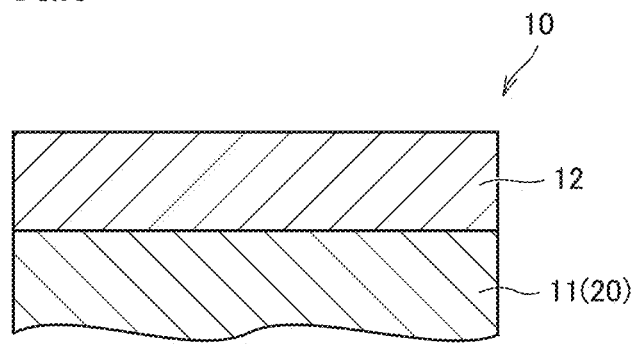
FIG. 3 is a schematic cross-sectional view of the cutting tool in the present embodiment.

In addition, the tool may further comprise a coating that is provided on the cubic boron nitride sintered material (refer to FIG. 3). In such a case, the tool is enabled to have not only an excellent conductive property but also predetermined characteristics such as wear resistance and breakage resistance. In one aspect of the present embodiment, in a case where the coating has a different color tone from the cubic boron nitride sintered material, it becomes possible to confirm the wear or the like of the coating due to the use of the tool visually and to specify the location used in the tool. The coating preferably has a thickness of 0.5 μm or more and less than 6.0 μm.

In one aspect of the present embodiment, in a case where the tool is a cutting tool, the cutting tool may further comprise a coating that is provided at least on a cutting edge portion.

In the present embodiment, it is preferable that the coating includes a coated layer composed of a compound represented by $Ti_xM_{1-x}C_yN_{1-y}$, in which, in the $Ti_xM_{1-x}C_yN_{1-y}$, M represents one or more elements selected from the group consisting of Group IV elements except titanium, Group V elements and Group VI elements in the periodic table, aluminum, silicon and boron, x is 0.2 or more and 1 or less, and y is 0 or more and 0.6 or less. In such a case, it is possible to effectively suppress development of the wear of the flank face in the case of processing hardened steel or the like.

The cubic boron nitride sintered material has an excellent conductive property. Therefore, in the case of forming the coating on the cubic boron nitride sintered material using a physical vapor deposition method (PVD method) such as an arc ion plating method, it becomes possible to form a coating having excellent adhesion to the cubic boron nitride sintered material.

That is, the tool further includes a coating that is provided on the cubic boron nitride sintered material, and, in a case where a scratch test is performed on the coating with a diamond indenter having R of 200 μm and a cone angle of 120°, the peeling load is preferably 20 N or more. In such a case, the tool is capable of exhibiting performance (for example, wear resistance, breakage resistance and the like) with no film peeling in the case of processing hardened steel or the like. Examples of a method for the scratch test include a method described in examples to be described below. Examples of a device that is used to perform the scratch test include REVETEST SCRATCH TESTER manufactured by Anton Paar GmbH.

Regarding a method for forming the coated layer, the coated layer is preferably formed by an arc ion plating method (an ion plating method in which a solid material is evaporated using vacuum arc discharge) or a sputtering method.

In the arc ion plating method, the coated layer can be formed using a metal evaporation source containing a metal species that is to configure the coated layer and a reaction gas such as $CH_4$ or $N_2$. As conditions for forming the coated layer by the arc ion plating method, it is possible to adopt well-known conditions that are known as conditions for forming the coated layer (coating) in the tool by the arc ion plating method.

In the sputtering method, the coated layer can be formed using a metal evaporation source containing a metal species that is to configure the coated layer, a reaction gas such as $CH_4$ or $N_2$ and a sputtering gas such as Ar, Kr or Xe. As conditions for forming the coated layer by the sputtering method, it is possible to adopt well-known conditions that are known as conditions for forming the coated layer in the tool by the sputtering method.

Ordinarily, in an arc type ion plating method, ionized configuration substances of a coated layer are accelerated at a bias voltage. That is, a negative bias is applied to a base material, whereby ionized metal cations are accelerated and reach the surface of the base material, and a film is growing. The volume resistivity of the base material is desirably small in order to effectively apply a bias to the base material. The volume resistivity of the cubic boron nitride sintered material, which is the base material, is preferably $5\times10^{-3}$ Ωcm or less in order to form a dense film capable of effectively suppressing development of wear in the case of using the cubic boron nitride sintered material as a tool.

More preferably, a method for manufacturing the tool of the present embodiment includes etching of the surface of the base material on which the coated layer is to be formed before the formation of the coated layer. This etching removes impurities that impair the adhesive force between the coated layer and the base material. Furthermore, the etching creates an anchoring effect by a surface state in which only a binder in a composite sintered material that is contained in the surface of the base material has been selectively removed and increases the adhesive force between the base material and the coated layer.

Ordinarily, in the arc type ion plating method and the sputtering method, etching is performed by ionizing a gas of Ar or the like and applying a negative bias to the base material. The volume resistivity of the base material is desirably small in order to effectively apply a bias to the base material, and the volume resistivity of the cubic boron nitride sintered material, which is the base material, is preferably $5\times10^{-3}$ Ωcm or less in order to effectively perform etching.

The cubic boron nitride sintered material according to the present embodiment has an excellent conductive property and thus can be used for uses such as bonding tools in addition to the tool. Examples of the bonding tool include a Tape Automated Bonding (TAB) tool.

<<Method for Manufacturing Cubic Boron Nitride Sintered Material>>

A method for manufacturing a cubic boron nitride sintered material according to the present disclosure, the method comprising:

preparing a cubic boron nitride powder and an aluminum material (hereinafter, referred to as "first step" in some cases), obtaining a precursor by bringing the cubic boron nitride powder into contact with the aluminum material (hereinafter, referred to as "second step" in some cases), and sintering the precursor at a sintering pressure of 4 GPa or higher and 7 GPa or lower and a sintering temperature of 1000° C. or higher and 1500° C. or lower (hereinafter, referred to as "third step" in some cases).

<First Step: Step of Preparing Cubic Boron Nitride Powder and Aluminum Material>

In the first step, a cubic boron nitride powder and an aluminum material are prepared.

(Cubic Boron Nitride Powder)

"Cubic boron nitride powder" in the present embodiment means a raw material powder composed of crystal grains of cubic boron nitride. As the cubic boron nitride powder, a commercially available product may be purchased or a cubic boron nitride powder may be manufactured by a well-known method. In order to obtain a cubic boron nitride sintered material having the above-described configuration, it is preferable to obtain the cubic boron nitride powder by appropriately formulating and mixing a fine-grain cubic boron nitride powder and a coarse-grain cubic boron nitride powder. In addition, a medium-grain cubic boron nitride powder, an ultra-coarse grain cubic boron nitride powder or both may be further formulated and mixed with the cubic boron nitride powder.

(Aluminum Material)

"Aluminum material" in the present embodiment means a raw material composed of metallic aluminum alone and a raw material composed of metallic aluminum and inevitable impurities. Examples of the inevitable impurities include iron (Fe), silicon (Si). As the aluminum material, a commercially available product may be purchased or an aluminum material may be manufactured by a well-known method.

The shape of the aluminum material is not particularly limited, and examples thereof include a plate shape, a powder shape, a foil shape (film shape) and the like. In one aspect of the present embodiment, the shape of the aluminum material is preferably a plate shape. That is, the aluminum material is preferably an aluminum plate. The thickness of the aluminum plate is, for example, 0.6 mm.

<Second Step: Step of Obtaining Precursor>

In the second step, the cubic boron nitride powder is brought into contact with the aluminum material to obtain a precursor. The aluminum material comes into contact with the cubic boron nitride powder in the precursor, whereby the aluminum material infiltrates the cubic boron nitride powder in the third step to be described below. Here, the present step does not intend to obtain a powder mixture (so-called complete powder) by mixing the cubic boron nitride powder and the aluminum powder.

In one aspect of the present embodiment, the precursor may be obtained by disposing the aluminum plate on a compact composed of the cubic boron nitride powder. In another aspect of the present embodiment, the precursor may be obtained by disposing the cubic boron nitride powders and the aluminum plates so as to laminate alternately. In still another aspect of the present embodiment, the precursor may be obtained by disposing a powder of aluminum on the cubic boron nitride powder.

The content proportion of the cubic boron nitride powder is preferably 70% by mass or more and 95% by mass or less and more preferably 80% by mass or more and 90% by mass or less based on the precursor.

The content proportion of the aluminum material is preferably 5% by mass or more and 30% by mass or less and more preferably 5% by mass or more and 20% by mass or less based on the precursor.

<Third Step: Step of Sintering Precursor>

In the third step, the precursor is sintered at a sintering pressure of 4 GPa or higher and 7 GPa or lower and a sintering temperature of 1000° C. or higher and 1500° C. or lower. Specifically, the precursor is introduced into an ultrahigh-pressure high-temperature device, and the sintering pressure and the sintering temperature are maintained for a predetermined time, thereby obtaining the cubic boron nitride sintered material. Here, the above-described "sintering pressure" and "sintering temperature" mean the pressure and the temperature during sintering in the ultrahigh-pressure high-temperature device, respectively.

The sintering pressure is preferably 4.5 GPa or higher and 6.5 GPa or lower and more preferably 5.0 GPa or higher and 6.0 GPa or lower.

The sintering temperature is preferably 1000° C. or higher and 1300° C. or lower and more preferably 1040° C. or higher and 1260° C. or lower. When the precursor is sintered in the above-described temperature range, there is a tendency that the proportion of $AlB_2$ that is generated in the binder phase increases and the conductive property of a cubic boron nitride sintered material to be obtained become superior.

The time necessary to sinter the precursor is preferably three minutes or longer and 60 minutes or shorter and more preferably five minutes or longer and 30 minutes or shorter.

The ultrahigh-pressure high-temperature device is not particularly limited, and examples thereof include Ultra High Pressure Diamond Press (product name) manufactured by Kobe Steel, Ltd.

Hitherto, the method for manufacturing a cubic boron nitride sintered material according to the present embodiment has been described. The manufacturing method is a concept including a manufacturing method by a so-called "infiltration method". That is, in one aspect of the present embodiment, the precursor may be sintered by the infiltration method in the third step.

As a conductive cubic boron nitride sintered material, conventionally, cubic boron nitride sintered materials containing cobalt in the binder phase are known. However, as the cubic boron nitride sintered materials containing the cobalt in the binder phase, only sintered materials having a thin thickness (for example, sintered materials having a thickness of 1.0 mm), sintered materials having a small size and the like can be manufactured, and the shapes and sizes of cubic boron nitride sintered materials to be manufactured were limited. For example, in the case of manufacturing a cutting edge-replaceable cutting insert (refer to FIG. 2), conventionally, the above-described cubic boron nitride sintered material was applied only to the tip portion of the cutting edge, which is to be involved in cutting, by brazing.

The cubic boron nitride sintered material according to the present embodiment can be given shapes or sizes suitable for intended uses by being manufactured by the above-described manufacturing method. For example, the use of the manufacturing method according to the present embodiment makes it possible to manufacture a cutting edge-replaceable cutting insert (refer to FIG. 2) wholly composed of the cubic boron nitride sintered material according to the present embodiment.

EXAMPLES

Hereinafter, the present invention will be described in detail using examples, but the present invention is not limited thereto.

<<Production of Cubic Boron Nitride Sintered Material>>

<First Step: Step of Preparing Cubic Boron Nitride Powder and Aluminum Material>

Cubic boron nitride powders and aluminum materials, which will be described below, were each prepared. The cubic boron nitride powders were obtained by mixing the following particles in a variety of formulations so that cubic boron nitride sintered materials to be obtained in the end had compositions shown in Table 2 to Table 4.

Cubic boron nitride powders
Particles having a particle diameter of 0.5 μm or more and 2 μm or less
Particles having a particle diameter of 3 μm or more and 5 μm or less
Particles having a particle diameter of 8 μm or more and 12 μm or less
Aluminum materials
Metal plate (aluminum plate) (thickness: 0.6 mm)
Metal powder (aluminum powder) (average particle diameter: 4.3 μm)

<Second Step: Step of Obtaining Precursor>

Precursors were obtained by bringing the cubic boron nitride powder and the aluminum material, which were prepared in the first step, into contact with each other in a variety of formulations so that cubic boron nitride sintered materials to be obtained in the end had compositions shown in Table 2 to Table 4. Specifically, first, the cubic boron nitride powder was put into nickel (Ni) capsules, and then the aluminum material was disposed thereon so as to come into contact with the cubic boron nitride powder. After that, the cubic boron nitride powder and the aluminum material were molded so as to form a predetermined shape, thereby obtaining compacts, which were the precursors. In a specimen number 24, a precursor (complete powder) was obtained by uniformly mixing the cubic boron nitride powder and the aluminum powder and putting the mixture into the capsule.

<Third Step: Step of Sintering Precursor>

The obtained precursors were put into an ultra-high temperature high-pressure device (manufactured by Kobe Steel, Ltd., product name: Ultra High Pressure Diamond Press) and sintered for 15 minutes at a sintering pressure of 5.0 GPa and sintering temperatures shown in Table 1.

Cubic boron nitride sintered materials of specimen numbers 1 to 4 and 7 to 28 were obtained by the above procedure. An attempt was made to produce a cubic boron nitride sintered material in which the content proportion of the cubic boron nitride particles was 98 vol % by reducing the amount of the aluminum plate from the raw materials in the same formulation as in the specimen number 4, but the precursor was not sintered (specimen number 5). In addition, an attempt was made to load the aluminum plate so as to make a formulation the same as that of the specimen number 1 except that only fine particles of the cubic boron nitride powder were used to sinter the precursor, but the precursor was not sintered (specimen number 6). A method for manufacturing the cubic boron nitride sintered materials of the specimen numbers 1 to 4, 7 to 23 and 25 to 28 corresponds to a so-called infiltration method. A method for manufacturing the cubic boron nitride sintered material of the specimen number 24 corresponds to a so-called complete powder method (powder method). The cubic boron nitride sintered materials of the specimen numbers 1, 3, 4, 10, 14, 15, 17, 20 to 23, 25, 26 and 28 correspond to the examples. The cubic boron nitride sintered materials of the specimen numbers 2, 5 to 9, 11 to 13, 16, 18, 19, 24 and 27 correspond to comparative examples.

TABLE 1

| Specimen number | Shape of aluminum material | Sintering temperature (° C.) | Sintering method |
| --- | --- | --- | --- |
| 1 | Metal plate | 1260 | Infiltration method |
| 2 | Metal plate | 1260 | Infiltration method |
| 3 | Metal plate | 1260 | Infiltration method |
| 4 | Metal plate | 1260 | Infiltration method |
| 7 | Metal plate | 1130 | Infiltration method |
| 8 | Metal plate | 1130 | Infiltration method |
| 9 | Metal plate | 1130 | Infiltration method |
| 10 | Metal plate | 1130 | Infiltration method |
| 11 | Metal plate | 1130 | Infiltration method |
| 12 | Metal plate | 1130 | Infiltration method |
| 13 | Metal plate | 1130 | Infiltration method |
| 14 | Metal plate | 1130 | Infiltration method |
| 15 | Metal plate | 1130 | Infiltration method |
| 16 | Metal plate | 1130 | Infiltration method |
| 17 | Metal plate | 1130 | Infiltration method |
| 18 | Metal plate | 1130 | Infiltration method |
| 19 | Metal plate | 1130 | Infiltration method |
| 20 | Metal plate | 1040 | Infiltration method |
| 21 | Metal plate | 1080 | Infiltration method |
| 22 | Metal plate | 1170 | Infiltration method |
| 23 | Metal plate | 1220 | Infiltration method |
| 24 | Metal powder | 1130 | Complete powder method |

TABLE 1-continued

| Specimen number | Shape of aluminum material | Sintering temperature (° C.) | Sintering method |
|---|---|---|---|
| 25 | Metal plate | 1260 | Infiltration method |
| 26 | Metal plate | 1260 | Infiltration method |
| 27 | Metal plate | 1260 | Infiltration method |
| 28 | Metal plate | 1260 | Infiltration method |

<<Characteristic Evaluations of Cubic Boron Nitride Sintered Material>>

For the obtained cubic boron nitride sintered materials, the content proportions of the cubic boron nitride particles, the content proportions of fine particles, medium particles, coarse particles and ultra-coarse particles, the compositions of binder phases and the volume resistivities of the cubic boron nitride sintered materials were obtained as described below. In addition, cross sections of the cubic boron nitride sintered materials were observed.

<Content Proportion of Cubic Boron Nitride Particles>

The content proportions of the cubic boron nitride particles in the cubic boron nitride sintered materials of the specimen numbers 1 to 4 and 7 to 28 were obtained by the following method. First, a cross-sectional sample of the cubic boron nitride sintered material was produced, and the cross section thereof was mirror-finished. Next, the processed surface of the cubic boron nitride sintered material was observed with a SEM at a magnification of 3000 times to obtain a SEM image. The crystal grains of cubic boron nitride in a predetermined visual field in the obtained SEM image were specified. The sum of the areas of the crystal grains specified by image processing was calculated, and the sum was divided by the area of the visual field, thereby calculating the content proportion (vol %) of the cubic boron nitride particles. Here, for the same cubic boron nitride sintered material, the same image analysis was performed on five or more visual fields, and the average value thereof was regarded as the content proportion of the cubic boron nitride particles. In the image processing, image processing-type particle size distribution software ("WinROOF ver. 7.4. 1" manufactured by Mitani Corporation) was used. The results are shown in Table 2 to Table 4.

<Content Proportions of Fine Particles, Medium Particles, Coarse Particles and Ultra-Coarse Particles Based on all Cubic Boron Nitride Particles>

In the cubic boron nitride sintered materials of the specimen numbers 1 to 4 and 7 to 28, the content proportion (vol %) of each of fine particles (particles having a particle diameter of 2 μm or less), medium particles (particles having a particle diameter of more than 2 μm and less than 5 μm), coarse particles (particles having a particle diameter of 5 μm or more) and ultra-coarse particles (among the coarse particles, particles having a particle diameter of more than 12 μm) based on the entire cubic boron nitride particles was obtained by the following method. First, the processed surface of the above-described cross-sectional sample was observed with a SEM at a magnification of 3000 times to obtain a SEM image. The particle diameter (Heywood particle: equal-area equivalent circle diameter) of each crystal grain was calculated from the obtained SEM image. The number of the measured crystal grains was set to 200 or more. The number of visual fields on which image analysis was performed was set to two or more visual fields. One visual field was 26 μm in length and 34 μm in width. The above-described series of operations for calculating the particle diameters of the crystal grains were performed using image processing-type particle size distribution software ("WinROOF ver. 7.4.1" manufactured by Mitani Corporation).

The crystal grains measured by the above-described procedure were classified into fine particles, medium particles, coarse particles and ultra-coarse particles depending on the particle diameters. The content proportion (vol %) of each of the fine particles, the medium particles, the coarse particles and the ultra-coarse particles was calculated by multiplying a value obtained by dividing the area of these particles by the area of the cubic boron nitride particles by 100. The results are shown in Table 2 to Table 4. Numerical values shown in parentheses in the "coarse particles" column of Table 2 to Table 4 indicate the content proportions of the ultra-coarse particles.

<Composition of Binder Phase>

Figure 7:
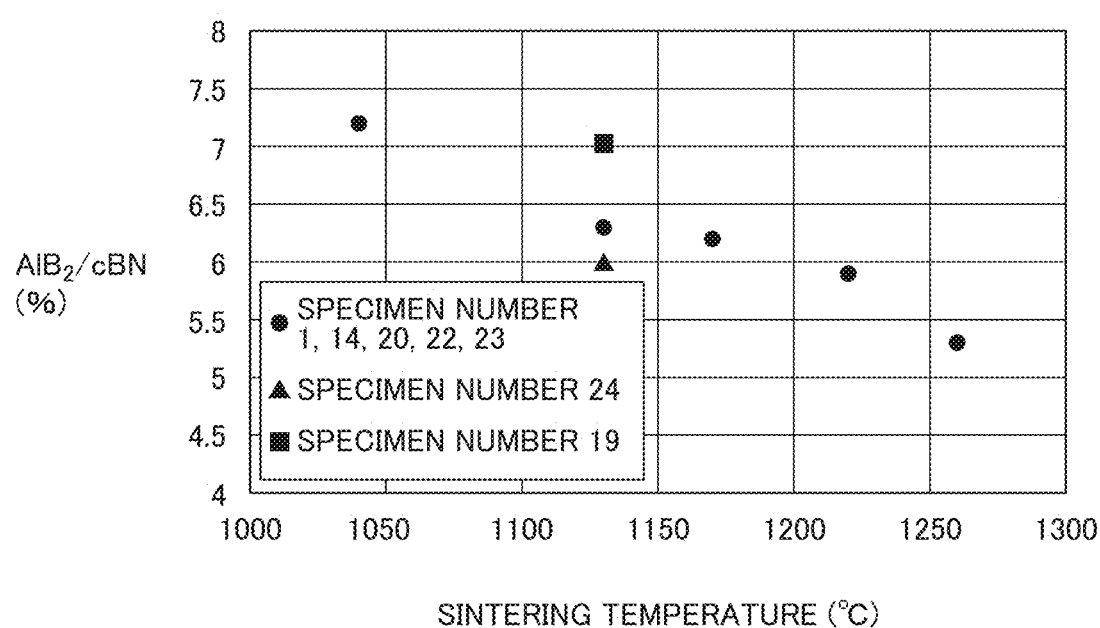
FIG. 7 is a graph showing a correlation between the sintering temperatures at the time of manufacturing the cubic boron nitride sintered materials and ratios of a peak intensity derived from aluminum diboride with respect to a peak intensity derived from cubic boron nitride particles in X-ray diffraction measurement.

The compositions of the binder phases in the cubic boron nitride sintered materials of the specimens 1 to 4 and 7 to 28 were obtained by an X-ray diffraction method. In addition, a specimen including the processed surface of the above-described cross-sectional sample was analyzed by the X-ray diffraction method, and the data of an X-ray diffraction pattern was acquired. After that, the peak intensity (the height of the peak; cps) derived from each component was obtained based on the composition of each of the cubic boron nitride particle and the binder phase and the data of the X-ray diffraction pattern. Based on the obtained peak intensities, the rate of the peak intensity derived from aluminum diboride with respect to the peak intensity derived from the cubic boron nitride particles and the rate of the peak intensity derived from the aluminum nitride with respect to the peak intensity derived from the cubic boron nitride particles were calculated. The results are shown in FIG. 7 and Table 2 to Table 4. In the graph of FIG. 7, the results corresponding to the specimen numbers 1, 14, 19, 20 and 22 to 24 are shown.

<Volume Resistivity of Cubic Boron Nitride Sintered Material>

Figure 6:
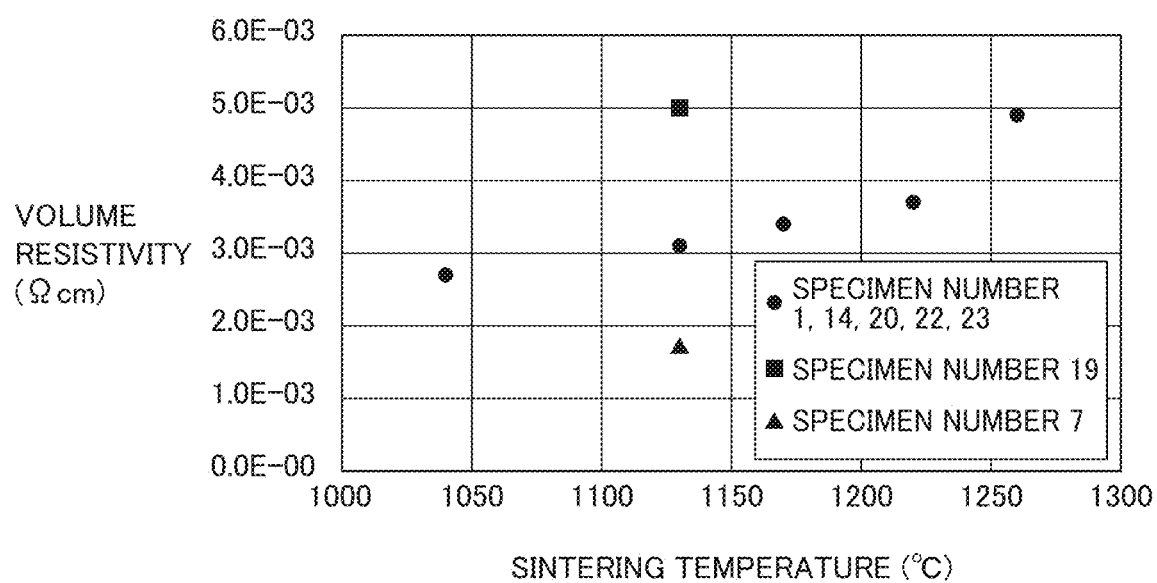
FIG. 6 is a graph showing a correlation between sintering temperatures at the time of manufacturing the cubic boron nitride sintered materials and volume resistivities of the cubic boron nitride sintered materials.

The volume resistivities of the cubic boron nitride sintered materials of the specimens 1 to 4 and 7 to 28 were obtained by a measurement method by a four-terminal method. Measurement conditions will be described below. As a measuring instrument, MILLIOHMMETER 4328A manufactured by Agilent Technologies Japan, Ltd. was used. As a four-terminal type probe, a pin type probe 16006A manufactured by Agilent Technologies Japan, Ltd. was used. The results are shown in Table 2 to Table 4 and FIG. 6. In the graph of FIG. 6, the results corresponding to the specimen numbers 1, 7, 14, 19, 20, 22 and 23 are shown.

Measurement Conditions
Dimensions of test piece: 3 mm×1 mm×12 mm
Pretreatment: None
Measurement temperature: 22° C.
Measurement humidity: 60%
Electrode interval: 10 mm <Cross-Sectional Observation of Cubic Boron Nitride Sintered Material>

Figure 4:
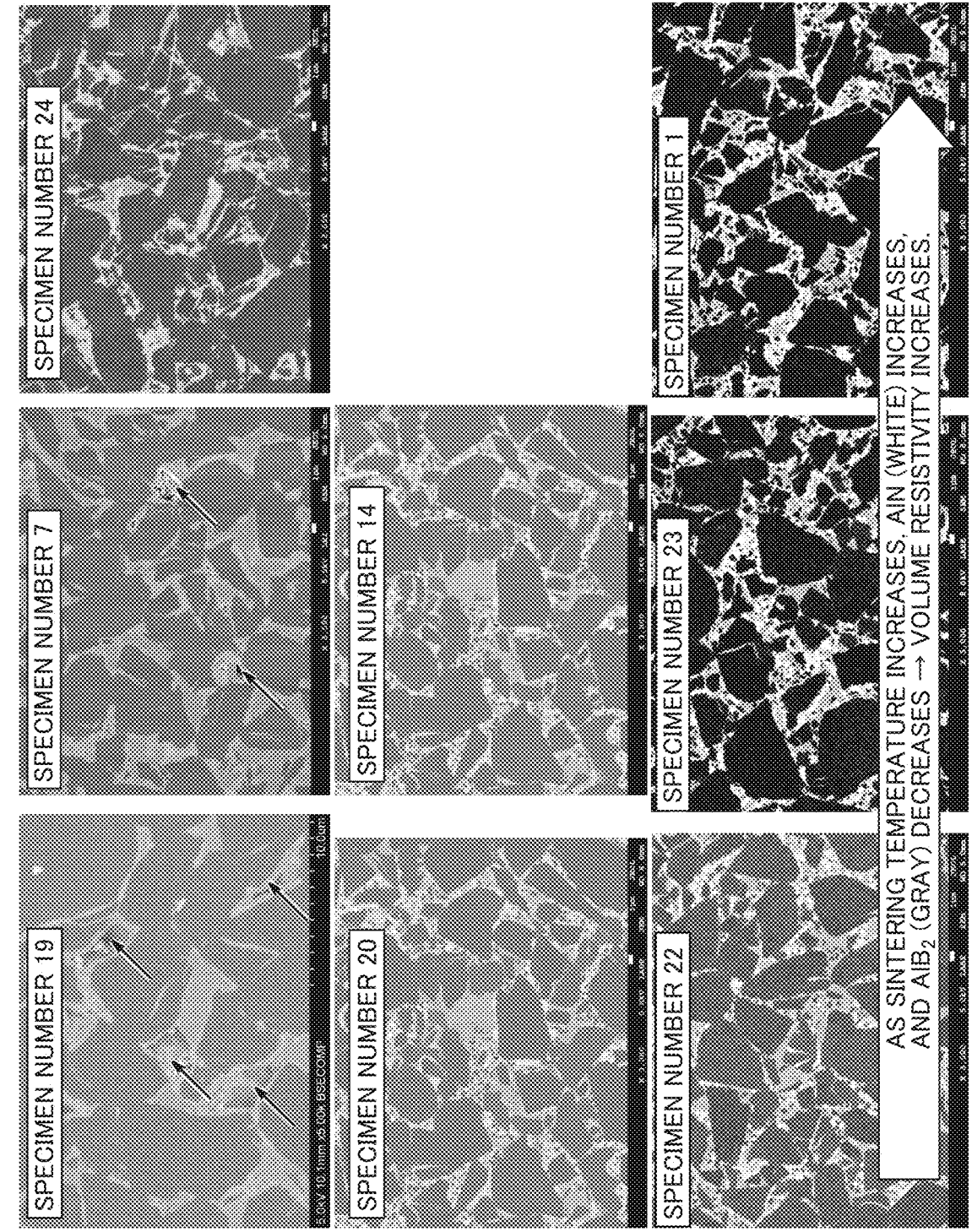
FIG. 4 is captured SEM images of cross sections of cubic boron nitride sintered materials.
Figure 5:
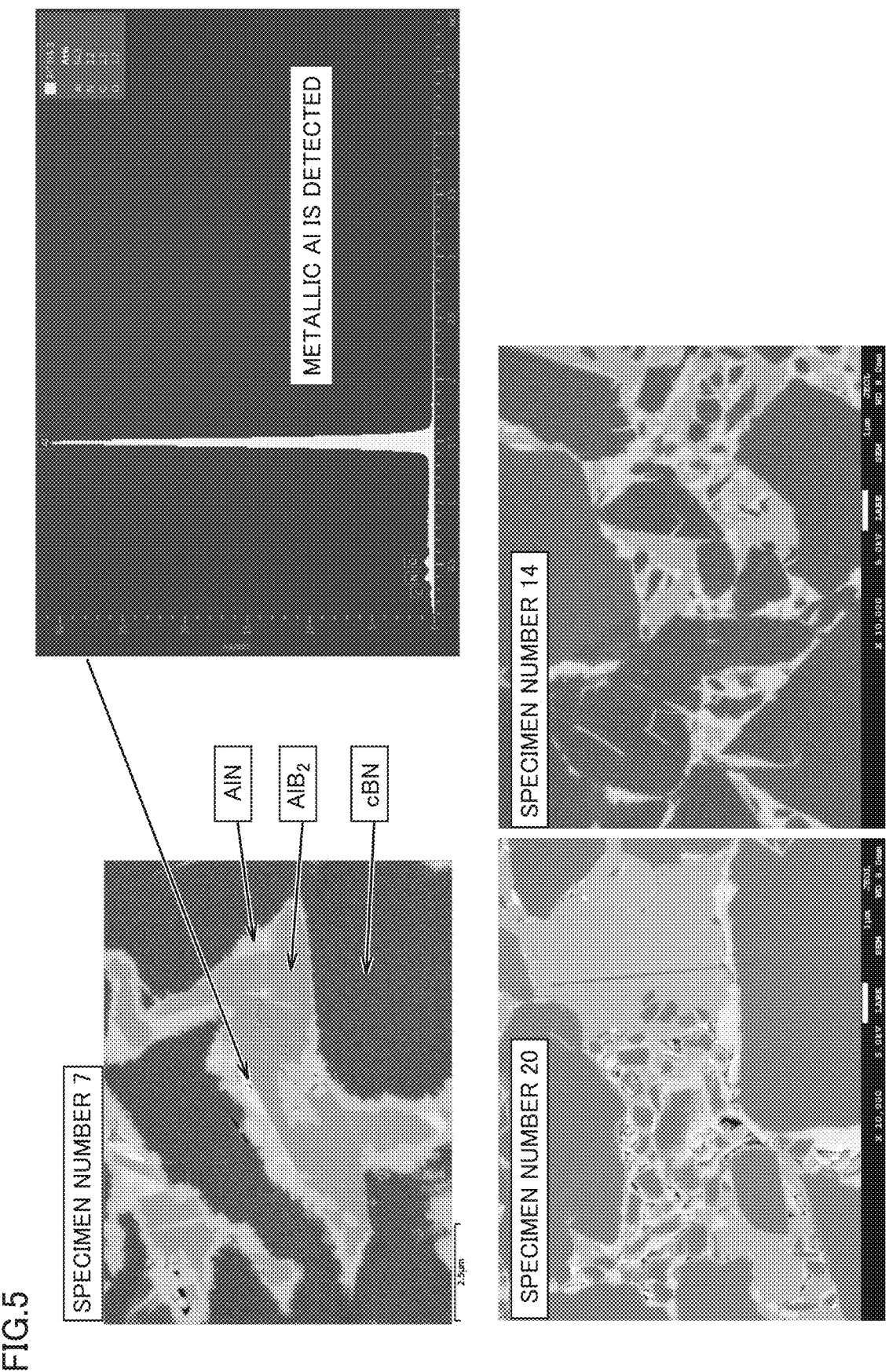
FIG. 5 is captured SEM images of cross sections of the cubic boron nitride sintered materials and a spectrum view showing analysis of the presence or absence of metallic Al on the cross sections.
Figure 8:
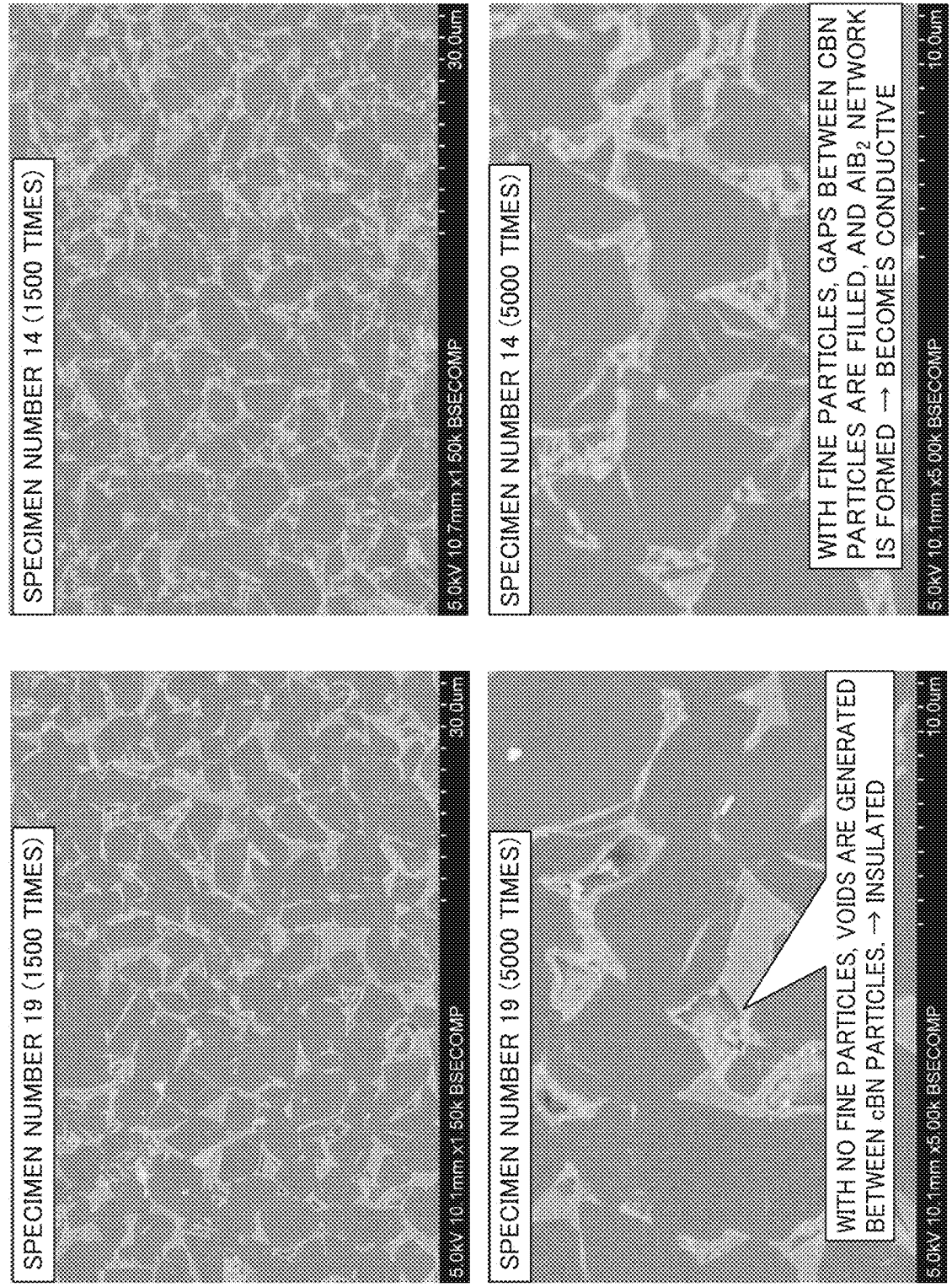
FIG. 8 is captured backscattered electron images of the cross sections of the cubic boron nitride sintered materials.
Figure 9:
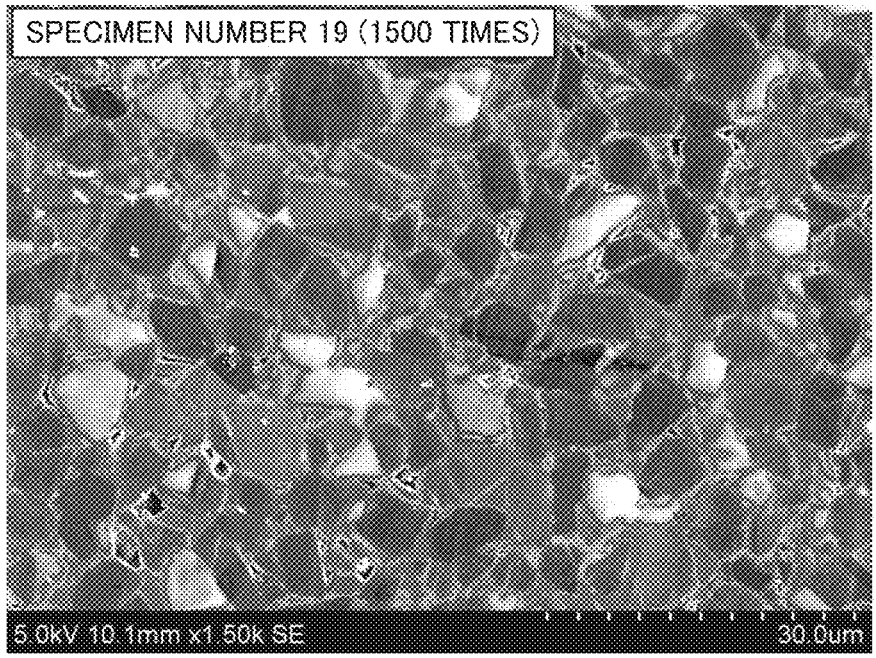
FIG. 9 is captured secondary electron images of the cross sections of the cubic boron nitride sintered materials.
Figure 9:
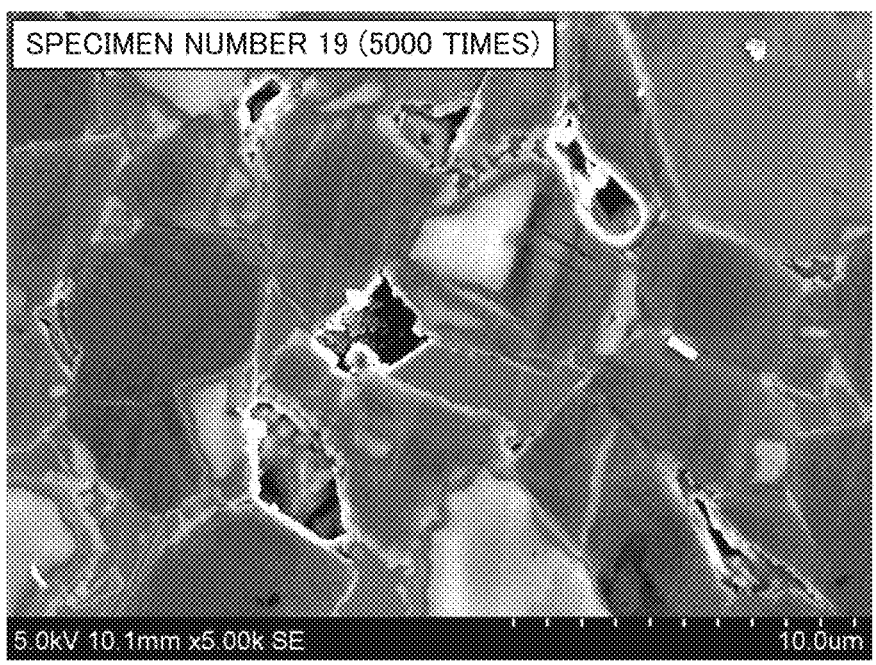

Cross-sectional samples of the cubic boron nitride sintered materials of the specimens 1 to 4 and 7 to 28 were observed with a SEM, and the networks or the like of $AlB_2$ in the binder phases were evaluated. The results are shown in FIG. 4, FIG. 8 (backscattered electron images) and FIG. 9 (secondary electron images). In the observation images of the cross-sectional samples by the SEM, black portions indicate the cubic boron nitride particles, and gray portions indicate aluminum diboride. In addition, white portions indicate aluminum nitride (refer to, for example, FIG. 4).

<<Evaluation of Cutting Tool Comprising Cubic Boron Nitride Sintered Material>>
<Gray Cast Iron Intermittent Process Test (1)>

In order to investigate the breakage resistance of a cutting tool comprising the cubic boron nitride sintered materials of the specimen numbers 1 to 4 and 7 to 13 and the specimen numbers 25 to 28, a cutting tool (shape: ISO standard SNGN090308) was produced using each cubic boron nitride sintered material, and intermittent turning was performed on a working material (material: FC300-6V fluted round bar). Specific cutting conditions are as described below. The results are shown in Table 2.

(Cutting Conditions)
Cutting velocity (Vc): 600 m/min.
Feeding amount (f): 0.3 mm/rev
Notch (ap): 0.5 mm
Coolant: Dry Evaluation method: The tool life was evaluated based on the cutting distance until the breakage size of the cutting tool exceeded 0.2 mm.

TABLE 2

| | Cubic boron nitride sintered material | | | | | | | | | | Cutting test |
|---|---|---|---|---|---|---|---|---|---|---|---|
| | Cubic boron nitride particles | | | | Binder phase | | | | Volume | | |
| Specimen number | Fine particles[a] | Medium particles[a] | Coarse particles[a] | Content proportion[b] | AlN/cBN[c] | AlB$_2$/cBN[c] | Al/cBN[c] | Content proportion[b] | resistivity ($\Omega$cm) | Void area rate | result (km) |
| 1 | 15% | 35% | 50% (0%)[d] | 83.0% | 9.7 | 5.3 | 0.0 | 17.0% | $4.90 \times 10^{-3}$ | 0.009% | 9.4 |
| 2 | 15% | 35% | 50% (0%) | 68.0% | 13.5 | 8.7 | 0.7 | 32.0% | $4.50 \times 10^{-3}$ | 0.000% | 5.6 |
| 3 | 15% | 35% | 50% (0%) | 71.0% | 14.3 | 8.2 | 0.5 | 29.0% | $4.30 \times 10^{-3}$ | 0.000% | 7.4 |
| 4 | 15% | 35% | 50% (0%) | 96.0% | 6.5 | 4.3 | 0.0 | 4.0% | $4.90 \times 10^{-3}$ | 0.300% | 7.2 |
| 7 | 3% | 20% | 77% (0%) | 76.0% | 16.0 | 13.9 | 3.2 | 24.0% | $1.70 \times 10^{-3}$ | 0.000% | 4.3 |
| 8 | 15% | 35% | 50% (0%) | 78.0% | 10.2 | 8.9 | 7.4 | 22.0% | $1.20 \times 10^{-3}$ | 0.000% | 5.5 |
| 9 | 15% | 35% | 50% (0%) | 80.0% | 10.1 | 8.4 | 1.3 | 20.0% | $2.00 \times 10^{-3}$ | 0.000% | 6.2 |
| 10 | 15% | 35% | 50% (0%) | 81.0% | 9.5 | 8.0 | 0.9 | 19.0% | $2.30 \times 10^{-3}$ | 0.000% | 7.2 |
| 11 | 5% | 95% | 0% (0%) | 83.0% | 12.3 | 3.4 | 0.0 | 17.0% | $5.90 \times 10^{-3}$ | 0.300% | 3.1 |
| 12 | 50% | 25% | 25% (0%) | 83.0% | 11.3 | 7.0 | 0.0 | 17.0% | $5.20 \times 10^{-3}$ | 0.400% | 2.5 |
| 13 | 5% | 90% | 5% (0%) | 83.0% | 12.1 | 2.8 | 0.0 | 17.0% | $6.00 \times 10^{-3}$ | 0.210% | 4.1 |
| 25 | 15% | 20% | 65% (0%) | 83.0% | 9.5 | 5.2 | 0.0 | 17.0% | $4.95 \times 10^{-3}$ | 0.090% | 7.6 |
| 26 | 15% | 10% | 75% (0%) | 83.0% | 9.4 | 5.1 | 0.0 | 17.0% | $5.00 \times 10^{-3}$ | 0.180% | 6.6 |
| 27 | 15% | 8% | 77% (0%) | 83.0% | 9.4 | 5.1 | 0.0 | 17.0% | $5.05 \times 10^{-3}$ | 0.200% | 6.4 |
| 28 | 30% | 5% | 65% (0%) | 83.0% | 9.2 | 5.0 | 0.0 | 17.0% | $4.95 \times 10^{-3}$ | 0.070% | 7.4 |

[a]Content proportions (vol %) based on all cubic boron nitride particles are indicated.

[b]Content proportions (vol %) based on all cubic boron nitride sintered material are indicated.

[c]Peak intensity rates (%) in XRD measurement are indicated.

[d]Content proportions (vol %) of "coarse particles having particle diameter of more than 12 μm" (ultra-coarse particles) based on all cubic boron nitride particles indicated.

<Gray Cast Iron Intermittent Process Test (2)>

In order to investigate the breakage resistance of a cutting tool comprising the cubic boron nitride sintered materials of the specimen numbers 14 to 18, a cutting tool (shape: ISO standard SNGN090308) was produced using each cubic boron nitride sintered material, and intermittent turning was performed on a working material (material: FC300-6V fluted round bar). Specific cutting conditions are as described below. The results are shown in Table 3.

(Cutting Conditions)
Cutting velocity (Vc): 800 m/min.
Feeding amount (f): 0.3 mm/rev
Notch (ap): 0.5 mm
Coolant: Dry Evaluation method: The tool life was evaluated based on the cutting distance until the breakage size of the cutting tool exceeded 0.2 mm.

TABLE 3

| Specimen number | Cubic boron nitride sintered material ||||||||| Volume ||  Cutting test result (km) |
|---|---|---|---|---|---|---|---|---|---|---|---|
| | Cubic boron nitride particles |||| Binder phase |||| | | |
| | Fine particles[a] | Medium particles[a] | Coarse particles[a] | Content proportion[b] | AlN/cBN[c] | AlB$_2$/cBN[c] | Al/cBN[c] | Content proportion[b] | resistivity ($\Omega$cm) | Void area rate | |
| 14 | 15% | 35% | 50% (0%) | 83.0% | 10.1 | 6.3 | 0.0 | 17.0% | 3.10 × 10$^{-3}$ | 0.040% | 6.4 |
| 15 | 11% | 39% | 50% (0%) | 83.0% | 10.0 | 5.5 | 0.0 | 17.0% | 4.10 × 10$^{-3}$ | 0.100% | 6.0 |
| 16 | 9% | 41% | 50% (0%) | 83.0% | 10.6 | 5.6 | 0.0 | 17.0% | 4.50 × 10$^{-3}$ | 0.120% | 4.2 |
| 17 | 15% | 48% | 37% (0%) | 83.0% | 10.4 | 4.2 | 0.0 | 17.0% | 4.40 × 10$^{-3}$ | 0.130% | 6.2 |
| 18 | 15% | 57% | 28% (0%) | 83.0% | 10.2 | 3.9 | 0.0 | 17.0% | 4.70 × 10$^{-3}$ | 0.170% | 3.9 |

[a]Content proportions (vol %) based on all cubic boron nitride particles are indicated.
[b]Content proportions (vol %) based on all cubic boron nitride sintered material are indicated.
[c]Peak intensity rates (%) in XRD measurement are indicated.
[d]Content proportions (vol %) of "coarse particles having particle diameter of more than 12 μm" (ultra-coarse particles) based on all cubic boron nitride particles indicated.

<Gray Cast Iron Intermittent Process Test (3)>

In order to investigate the breakage resistance of a cutting tool comprising the cubic boron nitride sintered materials of the specimen numbers 19 to 24, a cutting tool (shape: ISO standard SNGN090308) was produced using each cubic boron nitride sintered material, and intermittent turning was performed on a working material (material: FC300-6V fluted round bar). Specific cutting conditions are as described below. The results are shown in Table 4.

(Cutting Conditions)
Cutting velocity (Vc): 600 m/min.
Feeding amount (f): 0.3 mm/rev
Notch (ap): 1.0 mm
Coolant: Dry Evaluation method: The tool life was evaluated based on the cutting distance until the breakage size of the cutting tool exceeded 0.2 mm.

TABLE 4

| Specimen number | Cubic boron nitride sintered material ||||||||| | | Cutting test result (km) |
|---|---|---|---|---|---|---|---|---|---|---|---|
| | Cubic boron nitride particles |||| Binder phase |||| | | |
| | Fine particles[a] | Medium particles[a] | Coarse particles[a] | Content proportion[b] | AlN/cBN[c] | AlB$_2$/cBN[c] | Al/cBN[c] | Content proportion[b] | resistivity ($\Omega$cm) | Void area rate | |
| 19 | 3% | 20% | 77% (0%) | 83.0% | 11.3 | 10.1 | 0.0 | 17.0% | 5.00 × 10$^{-3}$ | 0.600% | 3.2 |
| 20 | 15% | 35% | 50% (0%) | 83.0% | 10.2 | 7.2 | 0.0 | 17.0% | 2.70 × 10$^{-3}$ | 0.280% | 4.2 |
| 21 | 15% | 35% | 50% (0%) | 83.0% | 10.0 | 7.0 | 0.0 | 17.0% | 3.00 × 10$^{-3}$ | 0.050% | 6.2 |
| 14 | 15% | 35% | 50% (0%) | 83.0% | 10.1 | 6.3 | 0.0 | 17.0% | 3.10 × 10$^{-3}$ | 0.040% | 6.6 |
| 22 | 15% | 35% | 50% (0%) | 83.0% | 10.5 | 6.2 | 0.0 | 17.0% | 3.40 × 10$^{-3}$ | 0.025% | 6.8 |
| 23 | 15% | 35% | 50% (0%) | 83.0% | 10.2 | 5.9 | 0.0 | 17.0% | 3.70 × 10$^{-3}$ | 0.020% | 7.2 |
| 24 | 15% | 35% | 50% (0%) | 83.0% | 9.1 | 6.0 | 0.0 | 17.0% | 2.0 | 0.050% | — |

[a]Content proportions (vol %) based on all cubic boron nitride particles are indicated.
[b]Content proportions (vol %) based on all cubic boron nitride sintered material are indicated.
[c]Peak intensity rates (%) in XRD measurement are indicated.
[d]Content proportions (vol %) of "coarse particles having particle diameter of more than 12 μm" (ultra-coarse particles) based on all cubic boron nitride particles indicated.

<Evaluation Results>
(Regarding Volume Resistivity)

In the cubic boron nitride sintered material of the specimen number 24, the cubic boron nitride particles were composed of coarse particles, medium particles and fine particles. Therefore, voids were rarely formed due to the medium particles or the fine particles entering between the coarse particles (Table 4 and FIG. 4). However, the volume resistivity of the cubic boron nitride sintered material was 2.10 Ωcm (Table 4). This result suggested that, in the cubic boron nitride sintered material of the specimen number 24 manufactured by the complete powder method (powder method), the network of $AlB_2$ in the binder phase was not sufficiently formed.

In the cubic boron nitride sintered materials of the specimen numbers 1, 3, 4, 10, 14, 15, 17, 20 to 23, 25, 26 and 28, the cubic boron nitride particles were composed of coarse particles, medium particles and fine particles. Therefore, voids were rarely formed due to the medium particles or the fine particles entering between the coarse particles (Tables 2 to 4 and FIG. 4). In addition, since the cubic boron nitride sintered materials were manufactured by the infiltration method, conductive $AlB_2$ was uniformly distributed in the binder phases and sufficiently formed networks (Tables 2 to 4, FIG. 4 and FIG. 8). Therefore, the volume resistivities of the cubic boron nitride sintered materials of the specimen numbers 1, 3, 4, 10, 14, 15, 17, 20 to 23, 25, 26 and 28 were $2.30 \times 10^{-3}$ to $5.00 \times 10^{-3}$ Ωcm. That is, it was found that the cubic boron nitride sintered materials of the specimen numbers 1, 3, 4, 10, 14, 15, 17, 20 to 23, 25, 26 and 28 had an excellent conductive property. Comparison of the specimen numbers 20, 21, 14, 22, 23 and 1 shows a tendency that cubic boron nitride sintered material sintered at low sintering temperatures had a high content proportion of $AlB_2$ (refer to Tables 1 to 4 and FIG. 7) and a low volume resistivity (refer to Tables 1 to 4 and FIG. 6).

In the cubic boron nitride sintered material of the specimen number 11, the cubic boron nitride particles were almost composed of medium particles alone. Therefore, the content proportion of $AlB_2$ contained in the binder phase was low, and the volume resistivity was $5.90 \times 10^{-3}$ Ωcm.

In the cubic boron nitride sintered material of the specimen number 13, the cubic boron nitride particles were composed of a majority of medium particles and a small amount of fine particles and coarse particles. Therefore, the content proportion of $AlB_2$ contained in the binder phase was low, and the volume resistivity was $6.00 \times 10^{-3}$ Ωcm.

(Regarding Intermittent Process Test (1))

The results in Table 2 show that, for the cutting tools comprising the cubic boron nitride sintered materials of the specimen numbers 1, 3, 4 and 10 and the specimen numbers 25, 26 and 28 (examples), the cutting distances were 6.6 km or longer, which were favorable results. On the other hand, for the cutting tools comprising the cubic boron nitride sintered materials of the specimen numbers 2, 7 to 9 and 11 to 13 and the specimen number 27 (comparative examples), the cutting distances were 6.4 km or shorter.

(Regarding Intermittent Process Test (2))

From the results in Table 3, it was found that, for the tools in which the content proportion of the fine particles was 10 vol % or more, the content proportion of the coarse particles was 30 vol % or more and the total of the content proportion of the fine particles and the content proportion of the coarse particles was 50 vol % or more and 100 vol % or less with respect to the entire cubic boron nitride particles (specimen numbers 14, 15 and 17, examples), the tool lives were superior.

(Regarding Intermittent Process Test (3))

From the results in Table 4, it was found that, for the tools in which the area rate of voids was 0.05% or less (specimen numbers 14 and 21 to 23, examples), the tool lives were superior.

<<Evaluation of Cutting Tool Including Coating>>
<Formation of Coating>

A coating (coated layer) was formed by a PVD method on the surface of the cutting tool (shape: ISO standard SNGN090308) for which the cubic boron nitride sintered material of the specimen number 14 or the specimen number 24 was used as a base material by the following procedure.

(Etching Treatment on Surface of Base Material where Coating is to be Formed)

The surface of the base material was etched in a film-forming device. A vacuum pump is connected to this film-forming device, and a vacuum chamber, which can be put into a vacuum state, is disposed in the film-forming device. A rotary table is provided in the vacuum chamber, and this rotary table is configured to enable the base material to be set thereon via a jig. The base material set in the vacuum chamber can be heated with a heater provided in the vacuum chamber. In addition, a gas pipe for etching and the introduction of a gas for film formation is connected to the vacuum chamber through a mass flow controller (MFC) for flow rate control. Furthermore, in the vacuum chamber, a tungsten filament for generating Ar ions for etching is disposed, and an arc evaporation source or sputtering source for film formation to which a necessary power supply is connected is disposed. An evaporation source raw material (target) necessary for film formation is set in the arc evaporation source or sputtering source.

The base material of the above-described cubic boron nitride sintered material was set in the vacuum chamber of the film-forming device, and the inside of the vacuum chamber was put into a vacuum state. After that, the base material was heated to 500° C. while the rotary table was rotated at 3 rpm. Next, Ar gas was introduced into the vacuum chamber, the tungsten filament was discharged to generate Ar ions, a bias voltage was applied to the base material, and the surface of the base material (the surface of the base material on which a coated layer was to be formed) was etched with the Ar ions. Etching conditions at this time were as described below.

Pressure of Ar gas: 1 Pa
Substrate bias voltage: −450 V (Formation of Coated Layer)

A film was formed on the surface of the base material in the film-forming device. The deposition time was adjusted so as to obtain a film thickness shown in Table 5, and a coated layer, which was the coating, was formed under conditions to be described below.

(Conditions for Forming Coated Layer)

Target: Al (50 atom %) and Ti (50 atom %)
Introduced gas: $N_2$
Film formation pressure: 3.5 Pa
Arc discharge current: 140 A
Substrate bias voltage: −50 V
Table rotation speed: 3 rpm In a case where the composition of the coated layer was changed, the target component and the introduced gas were changed. In a case where the coated layer contained C as well as N, not only $N_2$ but also $CH_4$ were used as reaction gases, and the proportion of C or N was adjusted by adjusting the proportion of the flow rate of each gas. Cutting tools of specimen numbers 101 to 109 were produced by the above procedure.

<Evaluation of Adhesive Force Between Base Material of Cutting Tool and Coating (Scratch Test)>

The adhesive force between the base material and the coated layer in the cutting tools of the specimen numbers 101 to 109 was evaluated by the following procedure.

A diamond indenter was brought into close contact with the cutting tool fixed to a table, loads were gradually applied thereto, and the table was moved at a constant rate at the same time, thereby measuring the adhesive force between the base material and the coated layer. Specifically, a diamond indenter having R of 200 μm and a cone angle of 120° was used, loads of 10 to 100 N were applied over 90 seconds, and the table was moved by 4.5 mm. In addition, the peeling load was determined by determining a peeling point of a scratch mark by observation with an optical microscope or the like and measuring the vertical load at that deformation point as the peeling load. The same test was repeated three times on the same sample at different positions, and the average value of three peeling loads was taken. This measurement was performed using REVETEST SCRATCH TESTER manufactured by Anton Paar GmbH. The results are shown in Table 5. The results in Table 5 show that, for the cutting tools of the specimen numbers 102 to 108, the adhesive forces between the base material and the coated layer were 18 N or more, which were favorable results. On the other hand, for the cutting tool of the specimen number 109, the adhesive force between the base material and the coated layer were 11 N. For the cutting tools of the specimen numbers 102 to 108, the cubic boron nitride sintered material of the specimen number 14 having an excellent conductive property was used as the base materials. Therefore, it is conceivable that, when a coated layer is formed on the base material by the PVD method, the adhesive force between the base material and the coated layer improves.

<Cutting Test Using Cutting Tool Including Coating>

In order to investigate the wear resistance of the cutting tools of the specimen numbers 101 to 109, continuous turning was performed on working materials (material: SUJ2 round bars). Specific cutting conditions are as described below. The results are shown in Table 5.

(Cutting Conditions)
Cutting velocity (Vc): 150 m/min.
Feeding amount (f): 0.2 mm/rev
Notch (ap): 0.3 mm
Coolant: WET
Evaluation method: The tool life was evaluated based on the cutting distance until the amount of a flank face of the cutting tool worn exceeded 0.15 mm.

TABLE 5

| Specimen number of cutting tool | Specimen number of base material | Coating (coated layer) | Film thickness (μm) | Adhesive force (N) | Cutting distance* (km) |
|---|---|---|---|---|---|
| 101 | 14 | None | 0 | — | 0.5 |
| 102 | 14 | $(Ti_{0.5}Al_{0.5})N$ | 3.5 | 62 | 3.0 |
| 103 | 14 | $(Ti_{0.5}Al_{0.45}Si_{0.05})N$ | 3.4 | 63 | 3.0 |
| 104 | 14 | $Ti(C_{0.2}N_{0.8})$ | 3.6 | 57 | 3.0 |
| 105 | 14 | $(Ti_{0.5}Al_{0.5})N$ | 5.6 | 25 | 3.5 |
| 106 | 14 | $(Ti_{0.5}Al_{0.5})N$ | 6.2 | 18 | 1.1 |
| 107 | 14 | $(Ti_{0.5}Al_{0.5})N$ | 0.6 | 65 | 2.5 |
| 108 | 14 | $(Ti_{0.5}Al_{0.5})N$ | 0.4 | 70 | 1.2 |
| 109 | 24 | $(Ti_{0.5}Al_{0.5})N$ | 3.5 | 11 | 0.3 |

*Cutting distances moved until the amount of the flank face worn becomes 0.15 mm are indicated.

In the cutting tool of the specimen number 101 including no coatings, since thermal wear was likely to progress during the processing of hardened steel, it is considered that wear progressed on the flank face at approximately 0.5 km. In addition, in the cutting tool of the specimen number 109, since the adhesive force was low even when the coating (coated layer) was added to the insulating cubic boron nitride sintered material, the coating peeled off immediately due to cutting resistance during the processing of hardened steel, and the wear resistance-improving effect of the coating could not be obtained. In addition, when the film thickness exceeded 6 μm, the adhesive force was low, and, similarly, the wear resistance-improving effect was small (specimen number 106). When the film thickness was reduced to 0.4 μm, the coating did not peel off, but was worn to disappear, and thus the wear resistance-improving effect was small even in this case (specimen number 108).

The embodiment and the examples disclosed this time shall be considered to be exemplary in all aspects and to limit nothing. The scope of the present invention is shown not by the above-described embodiment and examples but by the claims and is intended to include equivalent meaning to the claims and all modifications within the scope.

REFERENCE SIGNS LIST

1 rake face, 2 flank face, 3 cutting edge ridgeline portion, 10 cutting tool, 11 base material, 12 coating, 20 cubic boron nitride sintered material, 21 cubic boron nitride particles, 23 binder phase

The invention claimed is:

1. A cubic boron nitride sintered material comprising:
cubic boron nitride particles; and
a binder phase,
wherein the binder phase contains aluminum nitride and aluminum diboride,
a content proportion of the cubic boron nitride particles is 70 vol % or more and 97 vol % or less with respect to the entire cubic boron nitride sintered material,
wherein the cubic boron nitride sintered material has a volume resistivity of $5 \times 10^{-3}$ Ωcm or less,
in a case where X-ray diffraction measurement is performed on an arbitrary surface or arbitrary cross section of the cubic boron nitride sintered material, a rate of a peak intensity derived from metallic aluminum with respect to a peak intensity derived from the cubic boron nitride particles is less than 1.0%,
wherein the cubic boron nitride particles include fine particles having a particle diameter of 2 μm or less and coarse particles having a particle diameter of 5 μm or more,
wherein the coarse particles optionally include ultra-coarse particles having a particle diameter of more than 12 μm, and
wherein with respect to the entire cubic boron nitride particles,
a content proportion α of the fine particles is 10 vol % or more,
a content proportion β of the coarse particles is 30 vol % or more,
a content proportion γ of the ultra-coarse particles is 25 vol % or less, and
a total of the content proportion α of the fine particles and the content proportion β of the coarse particles is 50 vol % or more and 100 vol % or less.

2. The cubic boron nitride sintered material according to claim 1, wherein with respect to the entire cubic boron nitride particles, the content proportion α of the fine particles is 10 vol % or more and 20 vol % or less, the content proportion β of the coarse particles is 30 vol % or more and 90 vol % or less, and the content proportion γ of the ultra-coarse particles is more than 0 vol % and 25 vol % or less.

3. The cubic boron nitride sintered material according to claim 1, wherein, in a case where X-ray diffraction measurement is performed on the arbitrary surface or arbitrary cross section of the cubic boron nitride sintered material, the rate of the peak intensity derived from aluminum diboride with respect to the peak intensity derived from the cubic boron nitride particles is 3.9% or more.

4. The cubic boron nitride sintered material according to claim 1, wherein an area rate of voids that are observed in the arbitrary surface or arbitrary cross section of the cubic boron nitride sintered material is 0.05% or less.

5. A tool comprising:

the cubic boron nitride sintered material according to claim 1.

6. The tool according to claim 5, further comprising:

a coating that is provided on the cubic boron nitride sintered material, wherein a peeling load is 20 N or more, in a case where a scratch test is performed on the coating with a diamond indenter having R of 200 μm and a cone angle of 120°.

7. The tool according to claim 6, wherein the coating includes a coated layer composed of a compound represented by $Ti_xM_{1-x}C_yN_{1-y}$, wherein M represents one or more elements selected from the group consisting of Group IV elements except titanium, Group V elements and Group VI elements in the periodic table, aluminum, silicon and boron, x is 0.2 or more and 1 or less, and y is 0 or more and 0.6 or less, in $Ti_xM_{1-x}C_yN_{1-y}$.

8. The tool according to claim 6, wherein the coating has a thickness of 0.5 μm or more and less than 6.0 μm.

* * * * *